(12) United States Patent
Marcheschi et al.

(10) Patent No.: US 9,121,948 B2
(45) Date of Patent: Sep. 1, 2015

(54) OPTICALLY STIMULATED LUMINESCENCE DOSIMETRY USING DOPED LITHIUM FLUORIDE CRYSTALS

(71) Applicants: Barbara A. Marcheschi, Fairfax Station, VA (US); Brian L. Justus, Springfield, VA (US); Alan L. Huston, Aldie, VA (US)

(72) Inventors: Barbara A. Marcheschi, Fairfax Station, VA (US); Brian L. Justus, Springfield, VA (US); Alan L. Huston, Aldie, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 14/198,912

(22) Filed: Mar. 6, 2014

(65) Prior Publication Data

US 2014/0264045 A1    Sep. 18, 2014

Related U.S. Application Data

(60) Provisional application No. 61/776,857, filed on Mar. 12, 2013.

(51) Int. Cl.
  *G01T 1/115*    (2006.01)

(52) U.S. Cl.
  CPC ...................... *G01T 1/115* (2013.01)

(58) Field of Classification Search
  CPC ............ G01T 1/105; G01T 1/10; G01T 1/11; G01T 1/115; G01T 1/02
  USPC .................................................... 250/368
  See application file for complete search history.

(56) References Cited

U.S. PATENT DOCUMENTS

| | | | | |
|---|---|---|---|---|
| 4,954,707 A | * | 9/1990 | Miller et al. | 250/337 |
| 5,025,159 A | * | 6/1991 | Miller et al. | 250/337 |
| 5,136,163 A | * | 8/1992 | Miller et al. | 250/337 |
| 5,567,948 A | * | 10/1996 | Miller | 250/484.5 |
| 6,087,666 A | | 7/2000 | Huston et al. | |
| 7,592,609 B2 | * | 9/2009 | Kim et al. | 250/484.5 |
| 2004/0159803 A1 | * | 8/2004 | Akselrod et al. | 250/581 |

(Continued)

FOREIGN PATENT DOCUMENTS

| WO | 9812575 A1 | 3/1998 |
|---|---|---|
| WO | 2012036570 A1 | 3/2012 |

OTHER PUBLICATIONS

A.J.J. Bos, "High sensitivity Thermoluminescence Dosimetry," Nuclear Instruments and Methods in Research B 184, 3-28 (2001.

(Continued)

*Primary Examiner* — Marcus Taningco
(74) *Attorney, Agent, or Firm* — US Naval Research Laboratory; Joslyn Barritt

(57) ABSTRACT

An optically stimulated luminescence (OSL) dosimeter system. An OSL reader configured to produce data indicative of a radiation exposure, one or more OSL dosimeters fabricated from a thermoluminescent material, a light stimulation source configured to stimulate the OSL dosimeter to produce luminescence emissions, and a light-detection system that measures the intensity of such luminescence emissions and converts the electrical signal to a binary string that can be processed by an appropriately programmed computer configured to analyze data from the reader and produce data indicative of an extent of radiation exposure. Dose information is obtained without requiring heating of the dosimeter. The dosimeter can be interrogated multiple times with minimal loss of dose information.

15 Claims, 3 Drawing Sheets

206
(front view)

(56) References Cited

U.S. PATENT DOCUMENTS

2004/0238757 A1     12/2004  Gaza et al.
2013/0341514 A1*    12/2013  Akselrod et al. ............. 250/362

OTHER PUBLICATIONS

S.W.S. McKeever, M. Moscovitch, and P. D. Townsend, Thermoluminescence Dosimetry Materials: Properties and Uses, Nuclear Technology Publishing, pp. 38-39, 50-51, 83-84, 97-98, 101, 104-105, 1995.

C.A. Carlsson, "Thermoluminescence of LiF: Dependence of Thermal History," Phys. Med. Biol. 14(1), 107-118 (1969).

S.W.S. McKeever, "Optically Stimulated Luminescence Dosimetry," Nuclear Instruments and Methods in Research B 184, 29-54 (2001).

K. Chakrabarti, V.K. Mathur, J.F. Rhodes and R.J. Abbundi, "Stimulated Luminescence in Rare-Earth-Doped MgS," Journ. Appl. Phys. 64(3), 1363-1366 (1988).

L. Botter-Jensen and S.W.S. McKeever, "Optically Stimulated Luminescence Dosimetry Using Natural and Synthetic Materials," Radiation Protection Dosimetry 65(1-4), 273-280 (1996).

M.S. Akselrod, A.C. Lucas, J.C. Polf, and S.W.S. McKeever, "Optically Stimulated Luminescence of Al2O3," Radiation Measurements 29(3-4), 391-399 (1998).

C.E. Andersen, C.J. Marckmann, M.C. Aznar, L. Botter-Jensen, F. Kjaer-Kristoffersen, and J. Medin, "An algorithm for real-time dosimetry in intensity-modulated radiation therapy using the radioluminescence signal from Al2O3:C," Radiation Protection Dosimetry 120 (1-4), 7-13 (2006.

L. Duggan M. Budzanowskic, K. Przegietkad, N. Reitsemae, J. Wong, and T. Kron, "The light sensitivity of thermoluminescent materials: LiF:Mg,Cu,P, LiF:Mg,Ti and Al2O3:C," Radiation Measurements 32, 335-342 (2000).

M. Osvay and L. Lembo, "Comparative investigations on UV sensitivity of newly developed LiF TL detectors," Radiation Protection Dosimetry 4, 227-230 (1993).

L. Oster, Y.S. Horowitz, and L. Podpalov, "OSL and TL in TLD—100 following alpha and beta irradiation: Application to mixed-field radiation dosimetry," iation Measurements 45, 1130-1133 (2010).

J.B. Lasky and P.R. Moran, "Thermoluminescent Response of LiF (TLD-100) to 5-30 keV Electrons and the Effect of Annealing in Various Atmospheres," Phys. Med. Biol., vol. 22, KO. 5, 852-862 (1977.

Luciana C. Matsushima, Glauco R. Veneziani, Leticia L. Campos, "Study of Optically Stimulated Luminescence of LiF: Mg,Ti for beta and gamma dosimetry," Radiation Measurements 56 (2013) 365-368.

Search Report and Written Opinion in corresponding PCT Application No. PCT/US2014/021059.

* cited by examiner

OPTICALLY STIMULATED LUMINESCENCE DOSIMETRY USING DOPED LITHIUM FLUORIDE CRYSTALS

CROSS-REFERENCE

This application is a Nonprovisional of, and claims the benefit of priority under 35 U.S.C. §119 based, on U.S. Provisional Patent Application No. 61/776,857 filed on Mar. 12, 2013, the entirety of which is hereby incorporated by reference into the present application.

TECHNICAL FIELD

The present invention relates to the measurement of a radiation dose received by a luminescent dosimeter after its exposure to ionizing radiation.

BACKGROUND

Radiation dosimetry involves the quantitative measurement of the physical changes that occur in matter upon exposure to ionizing radiation such as beta and alpha particles, neutral particles such as neutrons, and electromagnetic radiation such as X-rays and gamma rays. It is an important aspect of numerous civilian and military applications, including individual and environmental monitoring, retrospective and accident dosimetry, radiation therapy dosimetry, diagnostic radiology and nuclear medicine dosimetry, and neutron, particle and space dosimetry.

Thermoluminescence Dosimetry

Thermoluminescence dosimetry (TLD) has been the most widely used technique for measuring radiation doses for more than 50 years. See A. J. J. Bos, "High sensitivity Thermoluminescence Dosimetry," *Nuclear Instruments and Methods in Research B* 184, 3-28 (2001). Thermoluminescent dosimeters, also often referred to as thermoluminescent phosphors, operate on the principle that radiation interactions with a material such as a crystal or a glass cause ionization of atoms in the material creating free electrons and holes. Impurities deliberately added to the dosimeter form trapping centers that trap the free electrons in metastable states that can persist for long periods of time, up to many months or years. When the dosimeter is heated, trapped electrons are released and recombine with holes, and light is emitted at a characteristic wavelength that is associated with the luminescent impurity.

There are several types of TLD readers. One type utilizes a metal planchet that can be heated at a constant rate using electric current. Another type of reader uses a hot gas jet to heat the dosimeter. Still another type of reader utilizes a laser to heat a substrate that transfers heat to the TLD dosimeter. In each of these readers, the TLD dosimeter is heated at a constant rate and the emitted light, or "luminescence" from the dosimeter is detected by a photomultiplier tube. The amount of light emitted is proportional to the amount of radiation that was absorbed, with peaks in the detected luminescence being observed over specific temperature ranges.

A plot of this thermoluminescence vs. temperature is referred to as a "glow curve" such as the curve shown in FIG. 1. This glow curve can be analyzed to determine the absorbed dose. The temperatures associated with the glow peaks are related to the depths of the traps; the deeper the trap, the higher the temperature required to release the trapped electron. Peak temperatures of approximately 200 C are generally required to permit applications, such as personal dosimetry, that require relatively long-lived traps (low signal fade). This is a typical glow curve for a LiF dosimeter chip that has been exposed to radiation. The maximum peak intensity and the integrated area under the peaks indicate the level of radiation exposure that the dosimeter has undergone.

A typical TLD dosimeter is fabricated in small pieces, or "chips." A typical chip consists of a collection of microcrystals that are pressed into the form of a round, 3-4 mm diameter disk, or a 3-4 mm square piece that is between 0.1 and 0.7 mm thick. See, e.g., dosimeters produced by Thermo Fisher Scientific, Inc., described at http://www.thermoscientific.com/en/product/tld-100-thermoluminescent-dosimetry-material.html. These materials are also generally available as powders with grain sizes of 70 micrometers to 180 micrometers. The most widely used material for TLD dosimetry is lithium fluoride (LiF), containing magnesium (Mg) and titanium (Ti) impurities. A more sensitive variation of this dosimeter contains small amounts of copper (Cu) and phosphorous (P) (LiF:Mg,Cu,P).

The sensitivity, and thus the performance, of these dosimeters can be dramatically influenced by the thermal history of the material. See S. W. S. McKeever, M. Moscovitch, and P. D. Townsend, *Thermoluminescence Dosimetry Materials: Properties and Uses*, Nuclear Technology Publishing, pp. 38-39, 50-51, 83-84, 97-98, 101, 104-105, 1995 (McKeever 1995) As a result, a chip must be subjected to a rigorous thermal annealing protocol after its thermoluminescence signal has been read out in order to recover the chip's initial sensitivity. See C. A. Carlsson, "Thermoluminescence of LiF: Dependence of Thermal History," *Phys. Med. Biol.* 14(1), 107-118 (1969). In the case of LiF:Mg, Cu, P chips, heating above 250° C. for a period of time longer than about 30 minutes can permanently change their sensitivity. See McKeever 1995, supra, pp. 56-57.

Even if their sensitivity isn't permanently damaged, many TLD materials exhibit a decrease in their thermoluminescence efficiency as the temperature is increased. This occurs because nonradiative decay processes become more likely at higher temperatures. This results in thermal quenching of the thermoluminescence emission at elevated temperature and an overall reduction of the sensitivity of the TLD material. Thermal quenching can also cause the TL sensitivity to be highly dependent on the heating rate, with the TL sensitivity potentially being significantly reduced as a result of high heating rates. This can be a significant problem for high-throughput, commercial TLD readers. The ability to improve throughput by speeding up the reading rate is limited because large losses in the sensitivity of the TLD cannot be tolerated.

In addition, heating a TLD phosphor for readout irreversibly depopulates the trapped charges in the phosphor, thereby permanently erasing the stored dose information.

Optically Stimulated Luminescence

Metastable populated traps present in many TLD phosphors that have been previously exposed to radiation can also be depopulated optically in an optically stimulated luminescence (OSL) process that is analogous to thermal depopulation, where phosphors that exhibit optically stimulated luminescence undergo recombination luminescence that is observed after optical stimulation causes depopulation of the trapped charges, rather than depopulation by thermal heating.

Optical stimulation as understood by those skilled in the art is a phenomenon in which trapped charges such as trapped electrons in a phosphor are optically depopulated from their traps and subsequently recombine with holes at recombination sites in the material. See S. W. S. McKeever, "Optically Stimulated Luminescence Dosimetry," *Nuclear Instruments and Methods in Research B* 184, 29-54 (2001) (McKeever 2001). As with thermally stimulated luminescence, a fraction of those electrons and holes recombine radiatively, producing luminescence from the OSL phosphor.

The response time of a dosimeter readout in response to optical stimulation is determined by the lifetime of the free electrons after they are depopulated and the decay time of the luminescence, while the response time for thermal stimulation is determined by the heating rate applied to the TL dosimeter. In some materials the mechanism for optical stimulation of traps is the same as that for thermal stimulation of traps, while in other materials, the mechanisms may differ. See K. Chakrabarti, V. K. Mathur, J. F. Rhodes and R. J. Abbundi, "Stimulated Luminescence in Rare-Earth-Doped MgS," *Journ. Appl. Phys.* 64(3), 1363-1366 (1988).

In theory, optical stimulation is capable not only of depopulating the normal dosimetric traps that are accessible by heating, but also of reaching deeper traps that are not depopulated at the temperatures reached during a typical TLD readout. See L. Botter-Jensen and S. W. S. McKeever, "Optically Stimulated Luminescence Dosimetry Using Natural and Synthetic Materials," *Radiation Protection Dosimetry* 65(1-4), 273-280 (1996). Such deep traps can complicate the interpretation of TL readouts since they can communicate with the shallower traps, causing sensitization of the TL signal. This is a problem, for example, with TLD detection using TLD-100 as a dosimetry material. Id. In contrast, since optical stimulation may depopulate these deep traps, OSL dosimetry may provide a more accurate readout of the level of radiation exposure than does TL dosimetry.

In addition, although optical stimulation can completely depopulate all of the populated traps in an OSL dosimeter, complete depopulation of the traps is not a necessary consequence of OSL readout, whereas all thermally accessible traps are permanently read out by heating during a TL readout. In fact, use of a typical continuous wave (cw) or continuously illuminated OSL readout protocol that controls the readout light power and the readout duration often will erase only a small portion of the total trapped charges, providing the opportunity for subsequent OSL or TL readout of the OSL dosimeter.

OSL phosphors such as rare earth-doped alkaline earth sulfides are well known and have been studied extensively. The advantages exhibited by these OSL phosphors include high sensitivity and fast readout. See McKeever 2001, supra. In addition, the bulk temperature of an OSL phosphor is typically not raised due to optical stimulation as long as the amount of the stimulation light that is actually absorbed by the material is small. It follows that optical stimulation of the trapped charges occurs without incurring any of the numerous problems outlined above that are associated with thermal heating of TLD phosphors. For example, the sensitivity of an OSL dosimeter is not reduced during readout by thermal quenching and it is not expected to change as a result of readout. Many conventional OSL phosphors such as the alkaline earth sulfides, however, suffer disadvantages including high fading and poor long-term chemical stability. See M. S. Akselrod, A. C. Lucas, J. C. Polf, and S. W. S. McKeever, "Optically Stimulated Luminescence of Al2O3," *Radiation Measurements* 29(3-4), 391-399 (1998). Due to these problems, however, although they have been used in digital radiography applications where fading is not an issue, conventional OSL phosphors have not been adopted for dosimetry applications.

Optically stimulated luminescence dosimeters based on $Al_2O_3$:C were developed during the 1990s and introduced to the commercial market by Landauer in the early 2000s. The physical processes in $Al_2O_3$:C that are responsible for the OSL dosimeter characteristics are similar to those in other TLD materials, i.e. trapping of electrons at defect centers during exposure to radiation. Exposure to light, at appropriate wavelengths, releases the electrons from the traps and luminescence is emitted via electron-hole recombination.

The advantages of $Al_2O_3$:C include high TL sensitivity, cited as 50 times greater than the TL sensitivity of TLD-100, and low fading. The OSL sensitivity is claimed to be 5-10 times higher than its TL sensitivity. The primary disadvantage in the use of $Al_2O_3$:C for dosimetry applications is that in order to achieve the necessary OSL sensitivity the optical stimulation must be performed near the peak of the stimulation spectrum. The optically stimulated luminescence of $Al_2O_3$:C is centered at about 420 nm while the stimulation light wavelength is typically around 530 nm. See McKeever 2001, supra. The OSL readout system typically uses a pulsed stimulation source and a time-gated detector to prevent the excitation light from interfering with the signal. Id. The dose response has been shown to be "supra linear" for exposures above about 1 Gy. McKeever 1995, supra.

$Al_2O_3$:C dosimeters have been coupled to optical fibers and investigated for medical applications such as patient dose verification during radiotherapy. It was found that the radioluminescence sensitivity of the $Al_2O_3$:C was dependent on the accumulated dose. See C. E. Andersen, C. J. Marckmann, M. C. Aznar, L. Botter-Jensen, F. Kjaer-Kristoffersen, and J. Medin, "An algorithm for real-time dosimetry in intensity-modulated radiation therapy using the radioluminescence signal from $Al_2O_3$:C," *Radiation Protection Dosimetry* 120 (1-4), 7-13 (2006). For this application not only would one need to know the dose rate history in order to calculate the true total dose, but then a complex algorithm would be required to correct for the sensitivity changes that occurred during the measurements. Id.

$Al_2O_3$:C is less "tissue equivalent" than LiF-based dosimeters, and therefore displays an over-response for radiation energies below about 120 keV.

The OSL response of most of the commonly used synthetic TLD materials, including metal ion doped crystals of lithium fluoride, calcium sulfate, magnesium borate, and aluminum oxide, has also been previously investigated. See Botter-Jensen, supra. However, this work concluded that "all materials examined produce OSL, to a lesser or greater extent, and under conditions which vary from sample to sample. Generally, most of the synthetic materials showed weak OSL signals that cannot compete with the TL signals and they are of little interest for OSL dosimetry." They found that the most sensitive material, with the highest potential for OSL dosimetry, was carbon doped aluminum oxide, $Al_2O_3$:C. Since this early work, $Al_2O_3$:C has been extensively studied and has been commercialized by Landauer and is currently the only OSL dosimeter available for high sensitivity radiation dosimetry applications. See http://www.landauerinc.com/uploadedFiles/Healthcare_and_Education/Products/Dosimeters/LuxelSpecifications.en-US.pdf.

The sensitivity of TLD materials to light exposure is strongly suggestive of the potential utility of the material as an OSL dosimeter and has been previously studied by several groups. See McKeever 2001, supra; see also L. Duggan M. Budzanowskic, K. Przegietkad, N. Reitsemae, J. Wong, and T. Kron, "The light sensitivity of thermoluminescent materials: LiF:Mg,Cu,P, LiF:Mg,Ti and $Al_2O_3$:C," *Radiation Measurements* 32, 335-342 (2000); and M. Osvay and L. Lembo, "Comparative investigations on UV sensitivity of newly developed LiF TL detectors," *Radiation Protection Dosimetry* 4, 227-230 (1993).

However, extreme light sensitivity can be problematic in practice. For example, it is a problem if brief exposure to ambient or room lighting causes significant trap fading, or if exposure to sunlight or UV light results in the population of traps even though the TLD has not been exposed to radiation. This is problematic in that the radiation levels recorded by the dosimeter could be altered by trap fading or sunlight UV population, resulting in an inaccurate reading for the actual exposure seen.

A recent paper by Oster, Horowitz, and Podpalov described what was referred to as "optically stimulated luminescence" from LiF:Mg,Ti, also known as TLD-100 (Thermo Fisher Corporation). See L. Oster, Y. S. Horowitz, and L. Podpalov, "OSL and TL in TLD-100 following alpha and beta irradiation: Application to mixed-field radiation dosimetry,"*Radiation Measurements* 45, 1130-1133 (2010). In the work described in this paper, samples of TLD-100 were irradiated to very high doses of ~80 Gy to 120 Gy in order to create color centers in the crystals. The color centers have distinctive absorption bands in the visible portion of the optical spectrum. Excitation with light at a wavelength of about 440 nm results in luminescence from two distinct wavelength bands located at 535 nm and 645 nm. See McKeever 2001, supra.

However, the Horowitz paper incorrectly describes "photoluminescence" as "optically stimulated luminescence." In the luminescence process described in Horowitz, there is no ionization of the trapping center followed by luminescent recombination, and thus is a photoluminescence process that is different from optically stimulated luminescence as such a process is understood by those skilled in the art. See McKeever 2001, supra. Because the "OSL" signal they report in the paper is actually photoluminescence that occurs as a consequence of radiation damage to the material, the threshold for detection of their "OSL" signal was very high, 80 Gy and the optical method reported, using TLD-100, is not suitable for personal radiation dosimetry applications that require high sensitivity.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides an optically stimulated luminescence (OSL) dosimeter system configured to provide information regarding the level of exposure to radiation by a dosimeter formed from a luminescent crystalline powder.

An OSL dosimeter system in accordance with the present invention includes an OSL reader configured to produce data indicative of a radiation exposure, one or more OSL dosimeters fabricated from a thermoluminescent material, a stimulation light source configured to stimulate the OSL dosimeter to produce luminescence emissions, and a light-detection system that measures the intensity of such luminescence emissions and converts the electrical signal to a binary string that can be processed by an appropriately programmed computer configured to analyze data from the reader and produce data indicative of an extent of radiation exposure. In an exemplary embodiment, the dosimeter is formed from TLD-100 crystalline LiF powder mixed with an inert resin binder to form a chip.

An OSL reader in accordance with the present invention includes one or more lenses and mirrors configured to direct the stimulation light to the OSL dosimeter, one or more optical filters configured to filter out undesired wavelengths of light, a receptacle configured to receive and hold a dosimeter card containing one or more OSL dosimeters, and a photodetector configured to receive photons output from the dosimeter and to output data indicative of the number of photons received. The components of the OSL reader are housed contained within a light-tight housing configured to prevent extraneous light from entering the photodetector.

The stimulation light source in an OSL dosimeter system in accordance with the present invention typically is a solid state diode laser emitting a wavelength of about 800 nm. The laser light enters the light-tight housing and is filtered through a red glass filter to remove shorter wavelength amplified spontaneous emissions from the laser light incident on the dosimeter. As the filtered laser light stimulates the OSL chip, trapped electrons in the chip leave their traps in the crystalline powder and recombine with luminescent centers in the crystal to produce an emission of light from the chip. The light passes through a blue-green filter into a photomultiplier tube (PMT) assembly which converts the light into a cascade of electrons that are detected as voltage pulses or electrical currents which are converted to digital data. This digital data can then be processed with an appropriately programmed computer to produce data, e.g., in the form of glow curves, indicative of the dosimeter's exposure to radiation.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides an optically stimulated luminescence (OSL) dosimeter system configured to provide information regarding the level of exposure to radiation by a dosimeter formed from a luminescent crystalline powder.

Figure 1:
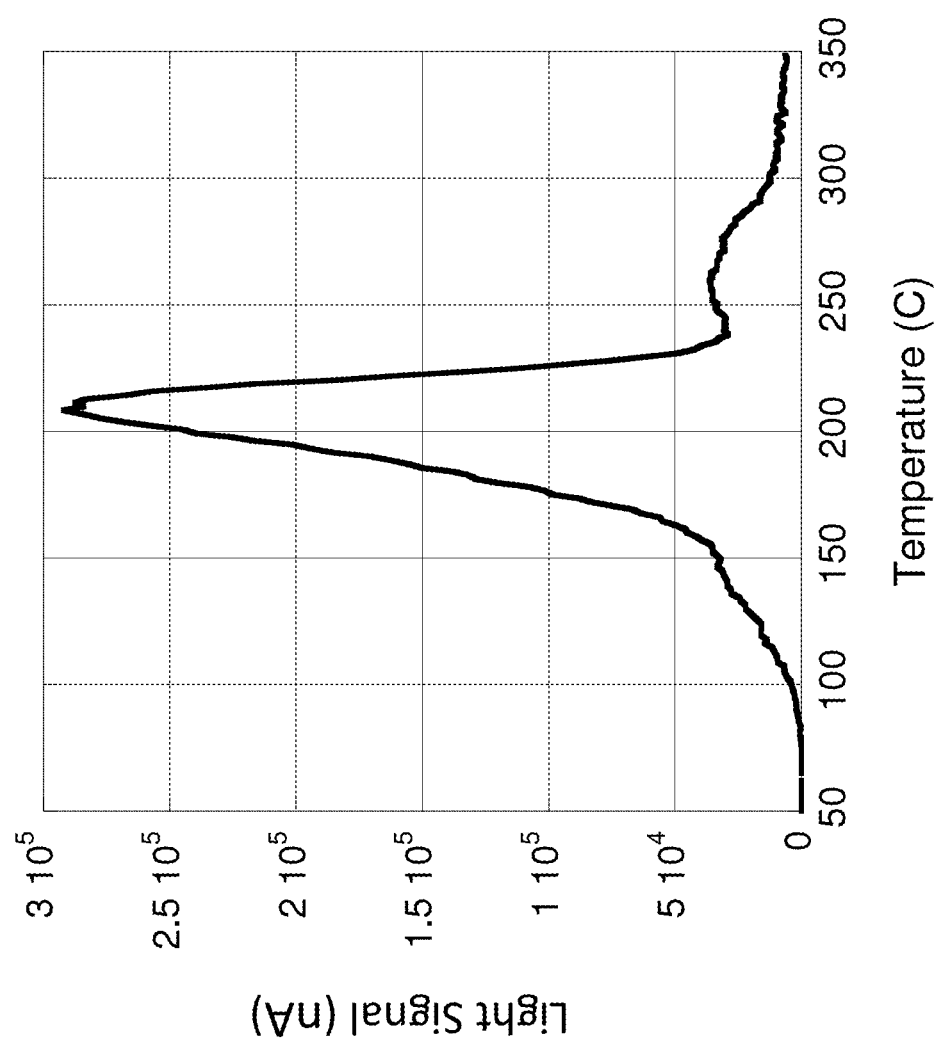
FIG. 1 is a plot showing a typical thermoluminescence glow curve obtained from TLD-100 powder after exposure to X-rays.
Figure 2:
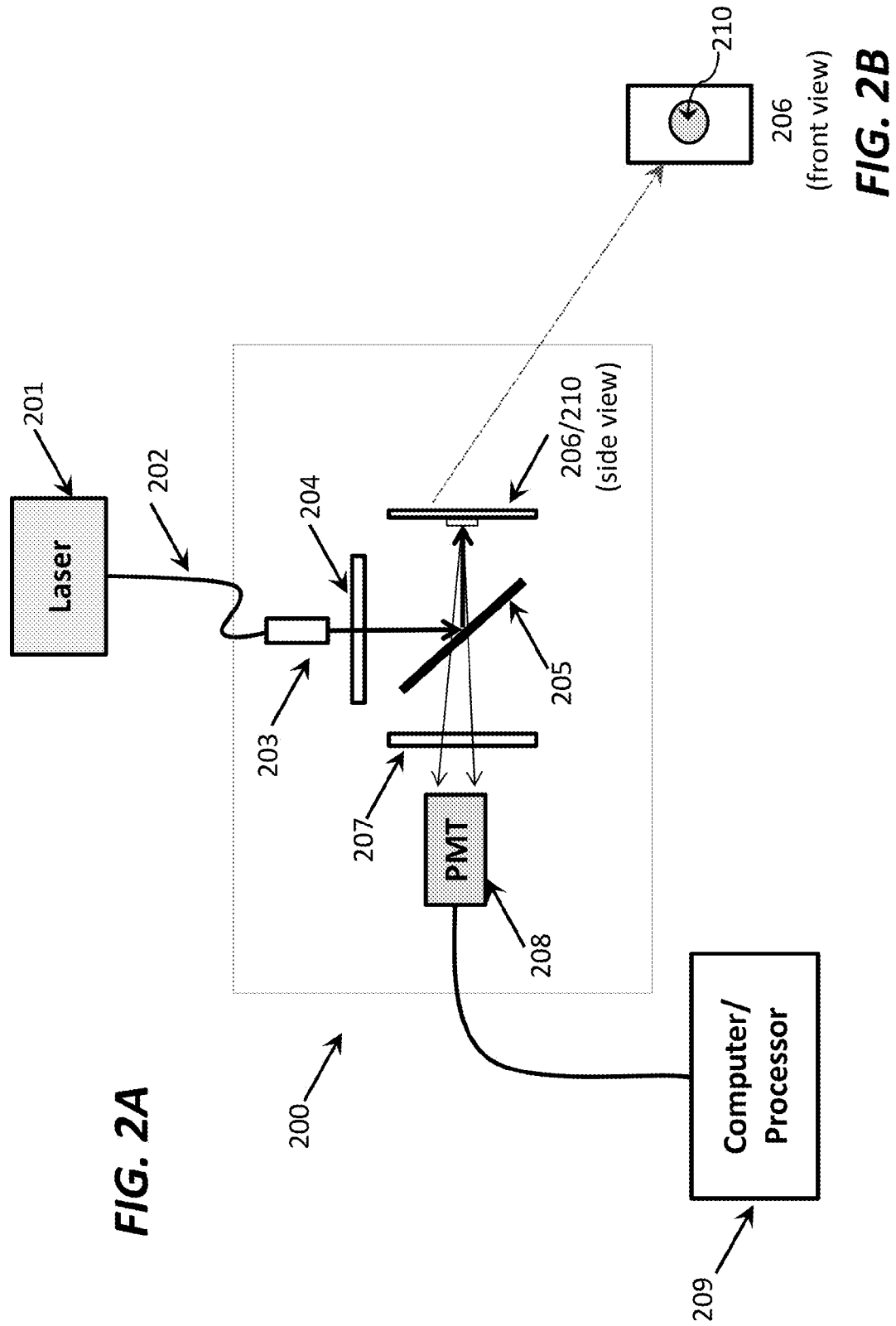
FIGS. 2A and 2B are block diagrams illustrating aspects of an exemplary embodiment of an optically stimulated luminescent (OSL) dosimeter system in accordance with some aspects of the present invention.

FIGS. 2A and 2B are simplified block diagrams illustrating aspects of an exemplary embodiment of an OSL dosimeter system in accordance with the present invention. As illustrated in FIGS. 2A and 2B and as described in more detail below, an OSL dosimeter system in accordance with the present invention includes a stimulation light source 201; an OSL reader configured to direct stimulation light from the laser to one or more OSL dosimeters 210 held in a dosimeter card 206 as shown in FIG. 2B and to output data indicative of an intensity of a luminescence emission from the dosimeters; and a computer/data processor 209 configured to receive and analyze data from the OSL reader and to produce data indicative of an extent of radiation exposure by the dosimeter.

As described in more detail below, an OSL dosimeter 210 in accordance with the present invention can be formed from conventional TLD materials such as TLD-100 powder available from Thermo Fisher Scientific, Inc., that have been combined with an inert resin mixture and formed into a dosimeter chip.

Stimulation light source 201 can be any suitable light source, such as an LED or a solid state diode laser, configured to provide light of sufficient intensity to OSL dosimeter 210. The preferred light source is a solid state diode laser, since there is a wide range of such lasers that operate at wavelengths throughout the visible and infrared regions suitable for laser stimulation of the OSL dosimeters. A commonly used wavelength for the stimulation light is 800 nm, but suitable wavelengths range from 400 nm to 1200 nm. The light source is usually operated continuously during the OSL measurement, although pulsed light sources can be used as well. The power of the light source may range between 0.01 W and 20 W, with typical power levels ranging from 0.5 Watt to 10 Watts. The beam spot size must be adjusted to be approximately the size of the dosimeter chip, and will typically be between about 2 mm and 5 mm. For spot sizes ranging between 2 mm and 5 mm, and power levels ranging between 0.5 W and 10 W, the corresponding range of stimulation intensities is between about 2.5 $W/cm^2$ and 300 $W/cm^2$.

As shown in FIG. 2A, components of an OSL reader in accordance with the present invention include a lens 203, one or more colored glass filters 204 and 207, dichroic mirror 205, and a photodetector such as photomultiplier tube (PMT) 208. These components are situated in a light-tight housing 200, which can be any suitable structure that provides a light-tight path for light to travel from laser 201 to OSL dosimeter 210 placed in the light-tight housing and then to PMT 208. In an exemplary embodiment, light-tight housing 200 can be in the form of an aluminum block having a covered, light-tight slot that can receive dosimeter card 206 holding OSL dosimeter chip 210, with the card preferably being situated in the slot so that the OSL chip is directly struck by stimulation light from laser 201.

Using an optical fiber 202 coupled to stimulation light source 201, the beam from the light source enters light-tight housing 200 and is guided to the OSL dosimeter 210 by means of lens 203 and colored glass filter 204. Before reaching the dosimeter, the beam is expanded and collimated by lens 203. Beam expansion is needed to increase the spot size of the beam, thereby lowering the intensity (since intensity=power per unit area) of the stimulation light to a level that will prevent the beam from causing localized heating that can damage the filter. Collimation of the beam is needed in order to be able to control the size of the beam at the dosimeter 210, insuring that the beam diameter nearly matches the size of the dosimeter 210. Ideally, the spot size of the light beam is not significantly smaller or larger than the size of the dosimeter 210.

The expanded and collimated beam then passes through colored glass filter 204, which removes spurious amplified and spontaneous emission in undesired wavelengths. In most embodiments, colored glass filter 204 is a red-colored glass filter, but other colored filters may be used as appropriate. The filtered light is then directed to the dosimeter using dichroic mirror 205. In an exemplary case, the laser beam was directed onto the dosimeter with a spot size of ~4 mm, full width at half maximum (FWHM), though of course, one can readily appreciate that the laser beam diameter can be adjusted to accommodate OSL dosimeters having other dimensions.

Upon exposure to the thus-filtered and directed light from stimulation light source 201, in a manner described above, electrons in traps formed in the crystal material upon its exposure to ionizing radiation are stimulated to leave their traps and combine with holes at recombination sites in the material. Some of these electrons and holes recombine radiatively, causing the dosimeter to emit light by means of optically stimulated luminescence, with the thus-produced light sometimes being referred to as an "OSL emission" or "OSL light," with an intensity of the OSL emission being indicative of an extent of the dosimeter's exposure to ionizing radiation. As shown in FIG. 2A, the OSL emission thus produced from OSL dosimeter 210 passes back through dichroic mirror 205 to be received by PMT 208. To ensure that only the OSL emission is received and processed by the photodetector, blue-green glass filter 207 is placed between dichroic mirror 205 and PMT 208 to absorb the stray 800 nm stimulation light to produce a filtered OSL emission. The thus-filtered OSL emission then enters PMT 208, which converts the received light emission into a cascade of electrons that are detected as voltage pulses or electrical currents which are converted to digital data. This digital data can then be processed with an appropriately programmed computer such as computer/data processor 209 to produce data, e.g., in the form of TL glow curves, indicative of the dosimeter's exposure to radiation.

As noted above, prior to the development of the OSL dosimeter and reader systems in accordance with the present invention, TLD materials were generally not considered to be suitable for OSL dosimetry. See Botter-Jensen, supra. To demonstrate that TLD-100 powder can be used in an OSL dosimetry system in accordance with the present invention, a sample of TLD-100 powder was exposed to x-rays in a Faxitron cabinet x-ray machine. Approximately 5 mg of the radiation-exposed TLD-100 powder was then placed in a shallow well approximately 3 mm in diameter and placed in the sample well of an OSL reader such as the reader described above, with stimulation light being provided by a solid-state diode laser operating in cw mode at 800 nm. The laser was turned on, illuminating the 3 mm diameter powder sample with 1 W of 800 nm light (8 $W/cm^2$), and in response to the stimulation light, the powder luminesced. The optically stimulated luminescence signal light was collected with a lens and focused through a colored glass filter to remove scattered stimulation light, was then directed onto the cathode of a photomultiplier that was operated in photon-counting mode, and the data output from the photomultiplier was input into a processor.

Figure 3:
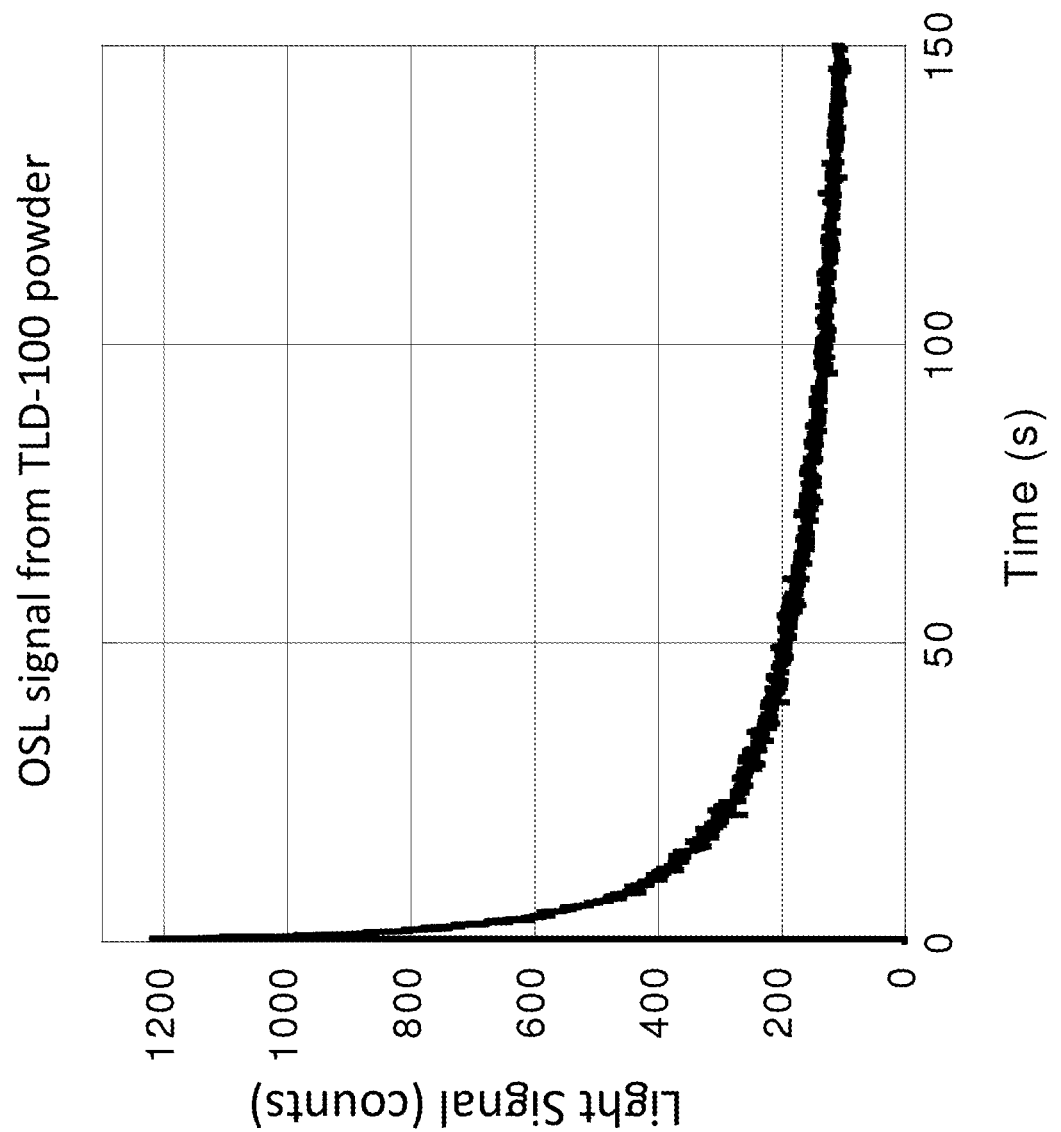
FIG. 3 is a plot showing an OSL signal obtained from TLD-100 powder exposed to X-rays using the exemplary OSL dosimeter system shown in FIG. 2.

FIG. 3 shows a plot of the resulting OSL trace. The characteristics of the OSL trace, such as the initial maximum of the curve and the integrated area below the curve can be analyzed to provide a quantitative measurement of the amount of radiation absorbed by the powder. If the radiation dose is relatively large, then adequate signal to noise may be obtained by stimulating the powder with light for a very short time, such as a second or even a fraction of a second. Good signal to noise can be obtained for powders exposed to smaller radiation doses by simply increasing the length of time the powder is stimulated. This increases the magnitude of the integrated area that is measured and provides improved signal to noise. Alternatively, increasing the intensity of the stimulation light will result in more rapid readout of the populated traps. Thus, improved signal to noise can also be obtained by increasing the intensity of the stimulation light instead of increasing the duration of the stimulation. As stated previously, it is not necessary to complete depopulate all of the traps in order to measure the absorbed dose. In many applications, it is desirable to read out only those traps that are needed to provide a measurement with adequate signal to noise. The remaining traps can be used to make additional measurements on the same sample. Similar results were obtained when the samples were exposed to a $^{60}$Co gamma-ray source.

Although the TLD-100 powder can be used directly, it is more challenging to handle a sample in a powder form than it is to handle a small chip. For example, care must be used to transfer the powder from the radiation source to the OSL reader. For conventional TLD applications, the TLD powder is typically pressed into a small, solid chip of mass ~10 mg that is easily handled with tweezers. However, the inventors found that such pressed chips, as obtained from the vendors, exhibited significantly less OSL sensitivity than the powder such that the chips could not be used to measure low dose exposures. The powder, on the other hand, exhibits very high OSL sensitivity and could be used to measure low doses, including mrem dose levels required for personal dosimetry applications.

Thus, in order to retain the favorable OSL characteristics of the powder and maintain the convenience of working with a chip, the inventors of the OSL reader system described herein combined the powder with an optically inert silicone resin and cured the resin to form an elastomeric solid material for use as OSL dosimeters. This material is easily handled and protects the TLD-100 powder from the effects of moisture and abrasion, while in other embodiments, transparent binders other than silicone can be used, such as water-free polymers.

In order to fabricate dosimeter pieces or chips that could be readily handled, the TLD-100-silicone resin mixture was injected into a thin-walled plastic tube having an inner diameter of 4 mm and cured to create a solid rod having a uniform diameter over the entire length of the rod. The rod was then sliced into thin disks that are similar in size to the TLD chips that are used for TLD dosimetry applications, and the chips placed in dosimeter holders such as the one illustrated in FIG. 2B. Of course, this process is merely exemplary, and any other suitable molding/curing process can be used to form chips having the same or other suitable dimensions.

Advantages

Although TLD-100 powder has been widely used as a TLD material, use of it in OSL dosimeters in accordance with the present invention may have several advantages over its use in TLD systems.

For example, TLD-100 powder having a much wider range of particle sizes can be effectively used in OSL dosimeters in accordance with the present invention.

It is widely known in the industry that when using TLD-100 powder as a TLD material, the magnitude of the thermoluminescent glow curve is diminished as the particle size of the powders falls below about 70 μm. See J. B. Lasky and P. R. Moran, "Thermoluminescent Response of LiF (TLD-100) to 5-30 keV Electrons and the Effect of Annealing in Various Atmospheres," *Phys. Med. Biol.*, Vol. 22, KO. 5, 852-862 (1977). Typical as-received TLD-100 powders come with a particle size range of 70-180 μm, with the majority of the size distribution falling above 100 μm. This TLD effect was confirmed in our studies.

However, we found that this was not the case when using TLD-100 as an OSL material. In studies of TLD-100 powders with particle sizes of below 54 microns, the measured OSL sensitivity was as large as that measured for the larger particle sizes. In some cases, powders having smaller particle size showed an even greater OSL sensitivity than the powder comprised of larger particles.

The effect is clearly illustrated when the powders were separated into particle size ranges before irradiation. We characterized TLD-100 powders separated into size ranges of greater than 149 μm, 74 μm to 149 μm, 74 to 100 μm, 54 to 74 μm, and smaller than 54 μm. Thermoluminescence dosimetry measurements confirmed that TLD-100 powders with particle sizes of less than 74 μm had dramatically decreased TLD signals. Further examination of TLD response of powders with particle sizes of less than 54 μm showed that this trend continued.

In contrast, using TLD-100 powder as an OSL material does not have this particle size limitation. The OSL signals obtained with TLD-100 powder with particle sizes below 74 μm were as large as or larger than those measured using larger particle-size powders. OSL measurements on particle sizes of less than 54 μm resulted in signals that were the same as the OSL signals obtained for the larger sized particles, showing no signs of reduced sensitivity with decreasing size. The use of smaller particle size powders is advantageous in the sense that it will allow for better mixing and homogeneous particle packing when making dosimeter chips or disks using the silicone resin technique described above in paragraph 49.

An OSL dosimeter system in accordance with the present invention has several other advantages over TLD dosimeter systems.

One advantage is that an OSL dosimeter system provides very rapid dose determination, typically less than 5 seconds, with the readout time decreasing as the power of the illumination source increases.

Another advantage is that no heating is required during readout. As a result, the OSL dosimeters can be read without any adverse effect to the dosimeter material due to heating.

In addition, traditional TLD materials need to be subjected to a rigorous annealing protocol after heating and readout to recover their initial sensitivity. Such annealing is not required for OSL dosimeters, and they can be reset by illumination with near infrared light from a typical filtered incandescent lamp.

Further, although previous attempts by others, see McKeever, supra, to demonstrate high sensitivity OSL dosimetry with conventional materials failed, the OSL dosimeter system in accordance with the present invention allows high-sensitivity OSL readout of conventional synthetic TLD materials.

The OSL dosimeter system in accordance with the present invention is compatible with existing technology and can be used with any well-characterized TLD phosphor that has been certified (e.g., by NAVLAP or DOELAP) for personal radiation dosimetry applications.

An OSL dosimeter system in accordance with the present invention produces optically stimulated luminescence having a large energy difference from the stimulating light. For the specific example provided using TLD-100 powder and a solid state diode laser operating at 800 nm, the optically stimulated luminescence is well separated, by hundreds of nanometers, from the stimulating light. This large wavelength difference allows for the use of extremely simple and inexpensive methods, such as colored glass filters and dielectric coated filters and mirrors, for optically isolating the stimulation light from the OSL light signal. Near infrared optical stimulation allows for simultaneous stimulation and collection of the luminescent signal using wavelength-discriminating colored glass and/or dielectric coated optical filters. More expensive and complicated techniques, such as temporal gating, are not required to separate the stimulation light from the signal light. Such techniques, however, are required when the stimulation source wavelength and the wavelength of the optically stimulated luminescence signal light are closely matched.

The stimulation light used in an OSL dosimeter system in accordance with the present invention is typically provided by solid state diode lasers, which are simple, reliable, compact, low cost, and rugged.

The OSL dosimeter system uses OSL chips that can be easily and quickly fabricated in high volumes. In one embodiment, the TLD powder is dispersed in silicone, cast into rods and then the rods are sliced into chips.

The TLD-100-based OSL dosimeters are relatively insensitive to room light, and so an OSL dosimeter system in accordance with the present invention can tolerate minor ambient light exposure and does not require a light-tight housing. They can be used in most clinical applications without excessive concern about brief exposure to room light.

Alternatives

Light stimulation source—The OSL art taught in this disclosure was demonstrated using a solid state diode laser operating at ~800 nm. Diode lasers operating at other visible and near-infrared wavelengths can also serve as effective stimulation sources. In addition, some light emitting diodes, filtered incandescent light bulbs or quartz-halogen lamps can function as stimulation sources.

The light stimulation source can be operated in "pulsed mode" rather than cw mode. In pulsed mode, the range of optical stimulation wavelengths can be extended to shorter wavelengths, for example 400 nm, that can more efficiently stimulate OSL. For short wavelength stimulation, the detection system must be time-gated to detect OSL after the stimulation laser is turned off. One operational mode would follow a protocol in which a 400 nm stimulation source is pulsed for 5 microseconds, while the gain of the detector is reduced, followed by a rapid increase of the detector gain and detecting the OSL signal for 100 microseconds. This process can be repeated as often as necessary.

In addition, there are many natural and artificial TLD phosphors, each having a wide range of powder particle sizes. Many of these classes of phosphors (e.g., fluorides, oxides, sulphates, and borates) may exhibit high OSL sensitivity, and the use of such additional phosphors in an OSL dosimeter system such as that described herein is contemplated to be within the scope of the present disclosure.

An OSL dosimeter system in accordance with the present invention can also be used for neutron dosimetry. Sensitivity to thermal neutrons can be achieved by the use of isotopically enriched phosphors. For example, thermal neutron sensitivity of doped lithium fluoride can be achieved by the use of isotopically enriched $^6$Li (TLD-600). Isotopically enriched $^7$Li, used in TLD-700, is completely insensitive to thermal neutrons and is used in conjunction with TLD-600 to characterize mixed radiation fields. (TLD-600 and TLD-700 are manufactured by Thermo Fisher Scientific, Inc.).

This invention describes a novel combination of optically stimulated luminescence materials and methods that exhibit improved characteristics for use in measuring radiation exposure. A well-known material in the TL dosimetry field, LiF: Mg, Ti, has been shown to yield high sensitivity in OSL dosimetry applications by using the method of measurement described in this patent. The combined advantages of a well-known and well-studied TL material with the speed, accuracy, and reliability of the OSL technique offers several advantages, as stated in this application.

Those skilled in the art will understand that although particular embodiments, aspects, and features have been described and illustrated, the invention described herein is not limited to only those embodiments, aspects, and features, and modifications to those embodiments may be made. The present application contemplates any and all modifications within the spirit and scope of the underlying invention described and claimed herein, and all such embodiments are within the scope and spirit of the present disclosure.

What is claimed is:

1. An optically stimulated luminescent (OSL) dosimeter system, comprising:
    an OSL dosimeter comprising a thermoluminescent phosphor material;
    an optical stimulation light source configured to provide a beam of optical stimulation light having a wavelength between 600 and 1100 nm to the OSL dosimeter; and
    an OSL reader, the OSL reader comprising:
        a dosimeter holder configured to hold the OSL dosimeter for illumination by the optical stimulation light;
        a lens configured to receive and collimate the optical stimulation light and to direct it to the OSL dosimeter;
        at least one first optical filter configured to remove spurious wavelengths from the collimated optical stimulation light to produce a filtered optical stimulation light having a first desired wavelength and a desired intensity;
        at least one second optical filter configured to receive the OSL emission from the OSL dosimeter and to remove spurious wavelengths from the optical stimulation light to produce a filtered OSL emission; and
        a photodetector configured to receive the filtered OSL emission from the dosimeter and to output data indicative of an intensity of the OSL emission produced by the thermoluminescent phosphor material, the intensity of the OSL emission being indicative of an extent of exposure of the OSL dosimeter to ionizing radiation
    the dosimeter holder, the lens, the first optical filter, the second optical filter, and the photodetector all being situated in a light-tight housing to prevent light other than the filtered OSL emission from entering the photodetector;
    wherein the filtered optical stimulation light illuminates the thermoluminescent phosphor material in the OSL dosimeter and causes the thermoluminescent phosphor material to produce an OSL emission as it is being stimulated by the filtered optical stimulation light, a speed of a production of the OSL emission being controllable by controlling an intensity of the optical stimulation light; and
    wherein the thermoluminescent phosphor material produces the OSL emission without a change in its temperature after its illumination by the filtered optical stimulation light.

2. The OSL dosimeter system according to claim 1, further comprising a processor configured to analyze the data output from the photodetector.

3. The OSL dosimeter system according to claim 1, wherein the stimulation light source is configured to emit light at a wavelength of about 800 nm.

4. The OSL dosimeter system according to claim 1, wherein the stimulation light source is a solid state diode laser.

5. The OSL dosimeter system according to claim 1, wherein the stimulation light source is configured to output a beam having a power of about 0.1 to about 10 Watts.

6. The OSL dosimeter system according to claim 1, wherein a power and a spot size of the stimulation light are configured to produce a stimulation intensity of between 10 W/cm$^2$ and 300 W/cm$^2$.

7. The OSL dosimeter system according to claim 1, wherein the OSL dosimeter comprises a thermoluminescent phosphor powder mixed with an optically inert material and formed into a dosimeter chip.

8. The OSL dosimeter system according to claim 7, wherein the thermoluminescent phosphor powder is a doped LiF crystalline powder.

9. The OSL dosimeter system according to claim 7, wherein the thermoluminescent phosphor powder is TLD-100 powder.

10. The OSL dosimeter system according to claim 1, wherein the OSL dosimeter comprises TLD-100 powder mixed with silicone resin and formed into a dosimeter chip.

11. The OSL dosimeter system according to claim 1, wherein the stimulation light source is one of a light emitting diode, a filtered incandescent light bulb, or a quartz-halogen lamp.

12. The OSL dosimeter system according to claim 1, wherein the stimulation light source is operated in a continuous wave (cw) mode.

13. The OSL dosimeter system according to claim 1, wherein the stimulation light source is operated in a pulsed power mode.

14. The OSL dosimeter system according to claim 1, wherein the OSL dosimeter is fabricated from a $^6$Li phosphor material; and
   wherein the dosimeter is configured to produce an OSL emission indicative of an exposure to thermal neutron radiation.

15. The OSL dosimeter system according to claim 1, wherein the OSL dosimeter further includes a $^7$Li phosphor material; and
   wherein the dosimeter is configured to produce an OSL emission indicative of exposure to more than one type of radiation.

* * * * *